(12) United States Patent
Burchett et al.

(10) Patent No.: US 7,806,465 B2
(45) Date of Patent: Oct. 5, 2010

(54) REMOVABLY CLAMPED PLATFORM

(75) Inventors: Chad Burchett, Molndal (SE); Rodney Phillips, Trinity, NC (US)

(73) Assignee: Volvo Group North America, LLC, Greensboro, NC (US)

( * ) Notice: Subject to any disclaimer, the term of this patent is extended or adjusted under 35 U.S.C. 154(b) by 275 days.

(21) Appl. No.: 12/086,809

(22) PCT Filed: Dec. 29, 2005

(86) PCT No.: PCT/US2005/047304

§ 371 (c)(1),
(2), (4) Date: Jun. 19, 2008

(87) PCT Pub. No.: WO2007/075170

PCT Pub. Date: Jul. 5, 2007

(65) Prior Publication Data

US 2009/0309390 A1    Dec. 17, 2009

(51) Int. Cl.
*B62D 25/00* (2006.01)

(52) U.S. Cl. .................................................. 296/184.1

(58) Field of Classification Search ............... 296/26.04, 296/184.1, 193.07; 411/81, 388, 396, 500, 411/548, 923
See application file for complete search history.

(56) References Cited

U.S. PATENT DOCUMENTS

| 1,579,570 | A | 7/1924 | Spangle |
| 2,901,279 | A | 8/1959 | MacNaught |
| 6,793,272 | B2 | 9/2004 | Borugian |

FOREIGN PATENT DOCUMENTS

| BE | 356181 A1 | 11/1928 |
| DE | 1784610 A | 9/1971 |
| FR | 650921 A | 2/1929 |
| GB | 391137 A | 4/1933 |

*Primary Examiner*—Lori L Lyjak
(74) *Attorney, Agent, or Firm*—Martin Farrell; Michael Pruden

(57) ABSTRACT

A removable deck plate or platform for a vehicle includes a platform for placement on a vehicle frame, a clamping plate for clamping the platform against the frame, a clamping arm engageable with the clamping plate via a hole in the platform, wherein the clamping arm and the clamping plate are configured so as to clamp the platform to the frame upon moving the clamping arm into a position adjacent the platform.

20 Claims, 5 Drawing Sheets

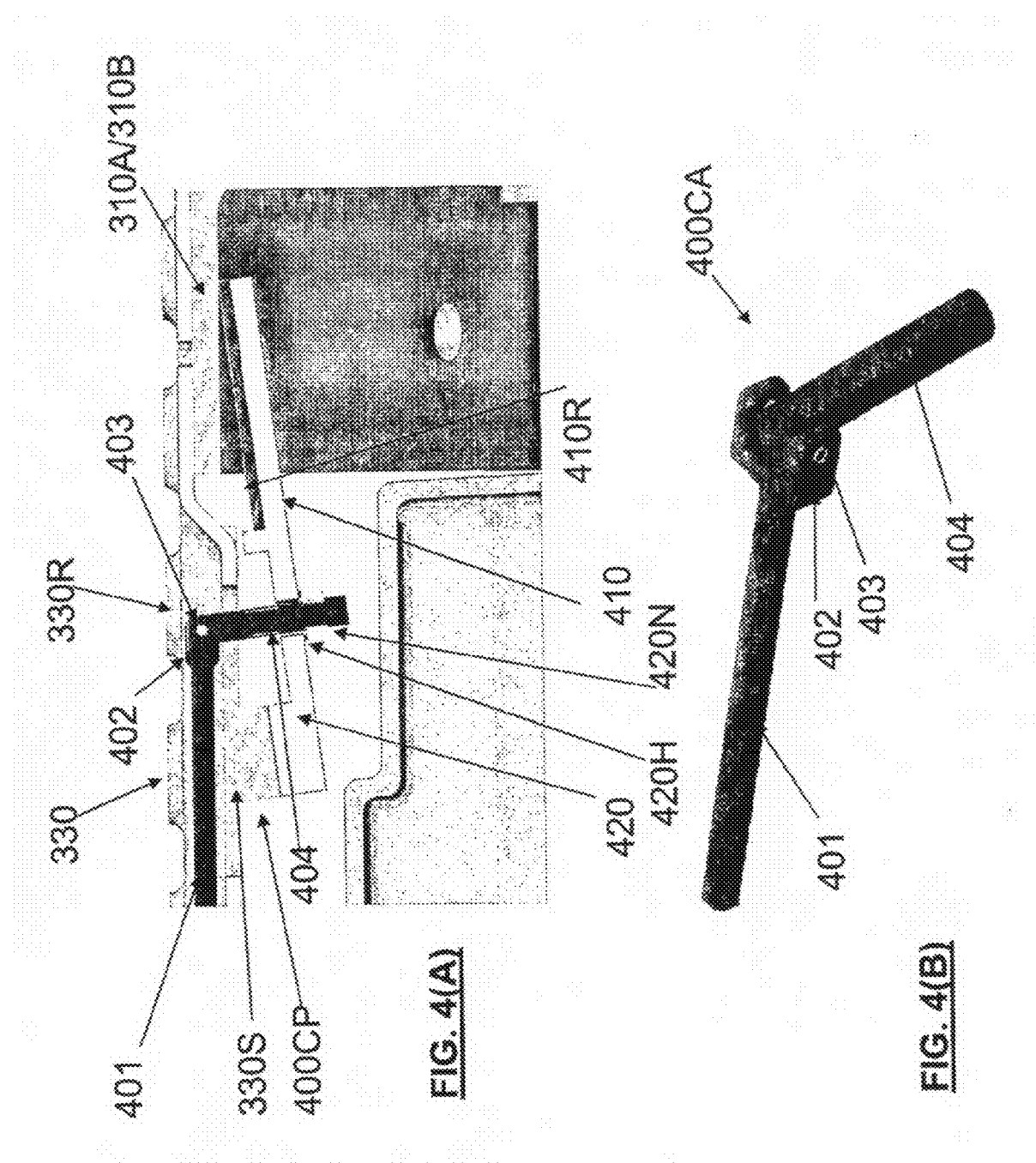

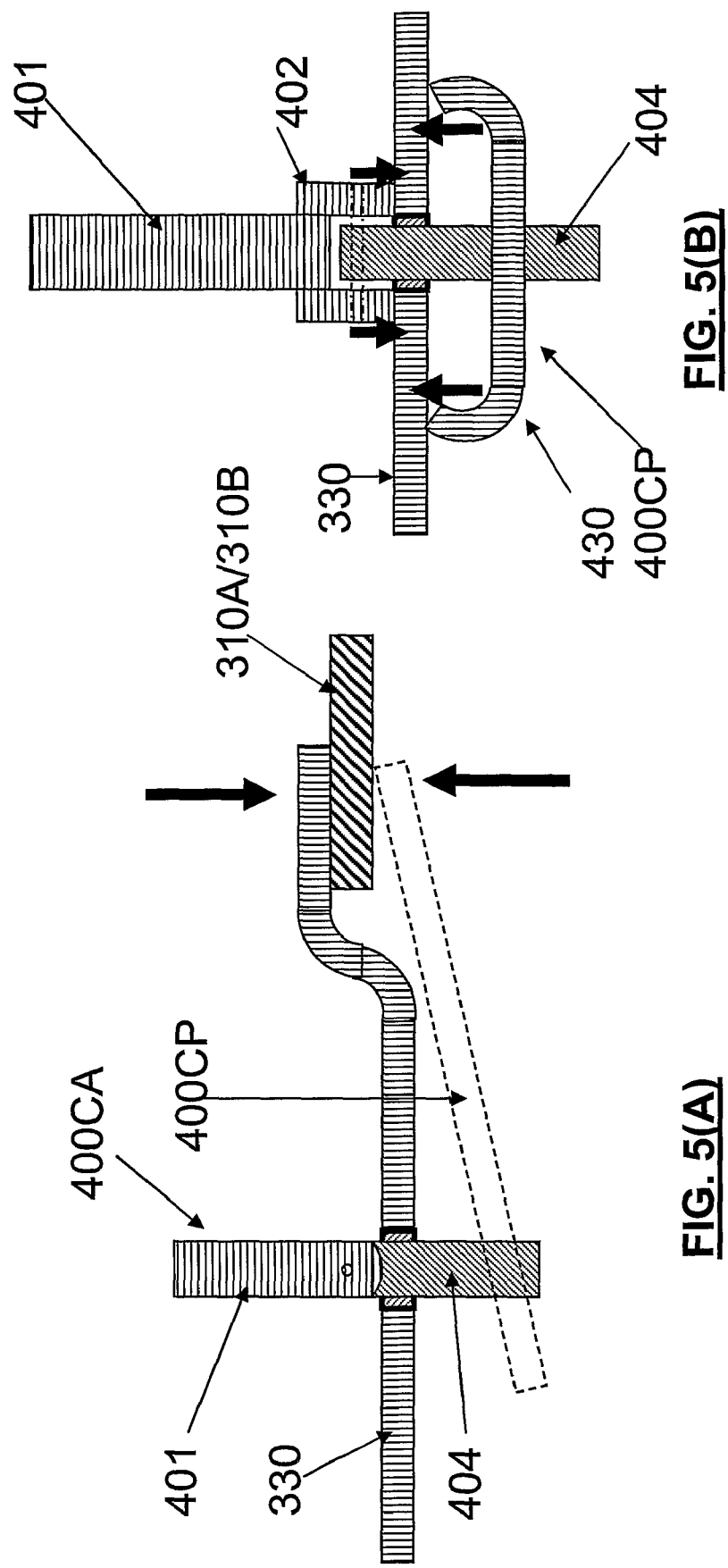

REMOVABLY CLAMPED PLATFORM

INTRODUCTION

The present invention relates to vehicle parts and components, and the preferred embodiments relate, e.g., to systems and methods for mounting platforms, such as, e.g., deck plates, floors, walls and/or panels within vehicles, especially within, e.g., trucks, tractors and/or commercial vehicles.

BACKGROUND

In various vehicles, especially in trucks, tractors and commercial vehicles, there is often a need to quickly and securely mount, and easily remove, platforms and/or other components upon the vehicle.

By way of example, in some trucks, tractors and/or the like, deck plates and/or other platforms are often supported upon a chassis frame of the vehicle. With reference to FIG. 1, in some examples, a truck or the like 100 includes a forward cab section 200 for accommodating a vehicle operator, and a chassis frame 300 having generally parallel frame members 310A and 310B extending substantially the entire length of the vehicle and having a plurality of cross-members (not shown) connecting between the frame members 310A and 310B).

As shown in FIG. 1, one or more deck plates 330, such as, e.g., deck plates 330A and/or 330B in the illustrated example are commonly supported upon the frame members 310A and 310B. Among other things, the deck plate(s) can provide a) a surface upon which an individual can walk, b) a surface upon which physical items can be supported, and c) a protective surface for vehicle components thereunder, such as, e.g., the drive shaft of the vehicle extending to the rear wheels W.

In some existing vehicles, a variety of pieces of hardware are required to fasten a deck plate or platform to the frame or support. For example, in some examples, a screw, a top plate, a bottom plate, a lock washer, and a nut are required to fasten the deck plate or platform to the support frame.

In addition, existing deck plate mounting techniques have required the use of external tools that must be maintained, stored and handled separately. The need for ancillary tools and complex mounting methods does not readily accommodate removal and/or replacement by a vehicle operator or service person.

In the design of trucks, tractors and commercial vehicles, weight is another factor to consider. In this regard, vehicle operators are often paid by the ton-mile, and highway regulations set maximum weights for loaded trucks and tractors. As a result, a reduction in the weight of the vehicle is directly proportional to the load that can be carried, meaning an increase in profitability of the vehicle. Even an apparently small decrease in vehicle weight can have a substantial increase in profitability of the vehicle over the lifetime of the vehicle. The combined weight of the multiple pieces of conventional hardware required to fasten platforms, such as, e.g., steps 320 and deck plates 330 shown in FIG. 1, is significant.

A few improved deck plate structures in the background art are depicted in the following U.S. patents of the present assignee, Volvo Trucks North America, Inc.: U.S. Pat. Nos. 6,793,272 and 6,722,728, each entitled Highway Vehicle Platform. Among other things, these background patents show some illustrative methods for assembling, e.g., a deck plate in a vehicle. For example, as described in the '272 patent, embodiments shown in FIG. 4 teach "deck plate 28 is snapped onto frame rails 32" wherein "flexible hooks 24 guide the deck plate 28 into position, bend inward when forced down and then snap back into place to secure the deck plate 28 to the frame rails 32." Id. As another example described in the '272 patent, in the embodiments shown in FIGS. 5, 7 and 8, the deck plate was fastened utilizing a rotated cam member in which "arcuate surface 62 defines a cam 74" and "he cam 74 applies more normal force between the support 12 and the platform 10 with little rotation of the fastener 52." Id.

While a number of systems and methods exist in the art, there is a continued need in the art for improved methods for mounting platforms, such as, e.g., deck plates, steps and/or the like in trucks, tractors and/or other commercial vehicles. As set forth below, the preferred embodiments of the present invention provide notable advancements over the above references and other existing systems and devices.

SUMMARY

The present invention overcomes various deficiencies and problems found in the above and/or other background art.

Among other things, in some preferred embodiments, platforms, such as, e.g., deck plates or the like for trucks, tractors and/or commercial vehicles can be a) secured to supports with substantially less hardware than that required for many traditional platforms, b) secured to supports without the need to store, locate and/or employ additional tools (such as, e.g., without the need for wrenches or the like), c) installed easily and in a short period of time, d) constructed so as to be light weight and cost effective, and/or e) installed in a manner to be readily removable by the vehicle operator or another individual.

According to some examples, a removable deck plate assembly for a vehicle is provided that includes: a) a deck plate for placement upon a frame; b) a clamping plate for clamping against the frame; c) a clamping arm engageable with the clamping plate via a hole in the deck plate; and d) the clamping arm and the clamping plate being configured so as to clamp the deck plate to the frame upon moving the clamping arm into a position adjacent the deck plate. In some preferred constructions, the clamping arm includes a cam, wherein the cam is configured to cam against an upper surface of the deck plate. In some other preferred constructions, the clamping arm includes an upper arm element that is pivotally connected to a lower arm element, and the lower arm element engages the clamping plate (preferably, the lower arm element is threaded to the clamping-plate). Preferably, the deck plate includes a trough configured to receive the upper arm element when pivoted into the position adjacent the deck plate. Advantageously, because the clamping mechanism operates from the top of the deck plate downward and through it, a removable deck plate assembly in accordance with the invention allows two deck plates to be mounted in side to side abutting relationship.

According to some other examples, a vehicle having a removable platform is provided that includes: a) a frame; b) a platform for placement upon the frame; c) a clamping plate for clamping against the frame; d) a clamping arm engageable with the clamping plate via a hole in the platform; and e) the clamping arm and the clamping plate being configured so as to clamp the platform to the frame upon moving the clamping arm into a position adjacent the platform. In some preferred examples, the platform is a deck plate of a truck and wherein the clamping arm includes a cam.

According to some other examples, a method for removably mounting a platform upon a vehicle is performed that includes: a) providing a platform and a clamping plate beneath the platform; b) locating the platform upon a frame of a vehicle with the clamping plate located adjacent to the frame; c) moving the clamping plate laterally beneath the frame, and then d) moving the clamping plate linearly upwardly to clamp the frame between the clamping plate and the platform. Advantageously, the method includes performing the steps c) and d) manually without ancillary tools. In addition, preferably the method further includes providing a clamping arm engaged with the clamping plate via an elongated through-hole in the platform, and the step c) includes manually sliding the clamping arm along the elongated through-hole. In addition, the method preferably includes performing the step d) using a clamping arm that is pivoted downward against the platform so as to clamp the platform to the frame upon moving the clamping arm adjacent the platform.

According to some other examples, a method for removably mounting a deck plate upon a vehicle is performed that includes: a) providing a deck plate between chassis frame members and providing at least one connector mechanism that extends from over the deck plate downward through the deck plate for connecting the platform to at least one of the chassis frame members; b) manually connecting the platform to at least one of the chassis frame members using the at least one connector mechanism without any ancillary tools. Preferably, the method also includes that the manually connecting the platform to at least one of the chassis frame members using the at least one connector mechanism without any ancillary tools includes manually laterally moving a clamping plate adjacent at least one of the frame members without ancillary tools and then manually vertically moving the clamping plate into contact with the at least one of the frame members without ancillary tools. In some implementations, the method further includes providing said connector mechanism within the periphery of said deck plate such that a second deck plate can be mounted in a side-to-side abutting relationship alongside said deck plate without interference from said connector mechanism.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 4(A) is a cross-sectional side view of the assembly shown in FIG. 3(A) as taken along the line 4A-4A in FIG. 3(A);

FIG. 4(B) is a perspective view of a clamping arm according to some preferred embodiments of the invention; and FIGS. 5(A) and 5(B) are schematic diagrams depicting clamping forces that can be applied in some illustrative and non-limiting embodiments of the invention.

DETAILED DESCRIPTION

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Figure 1:
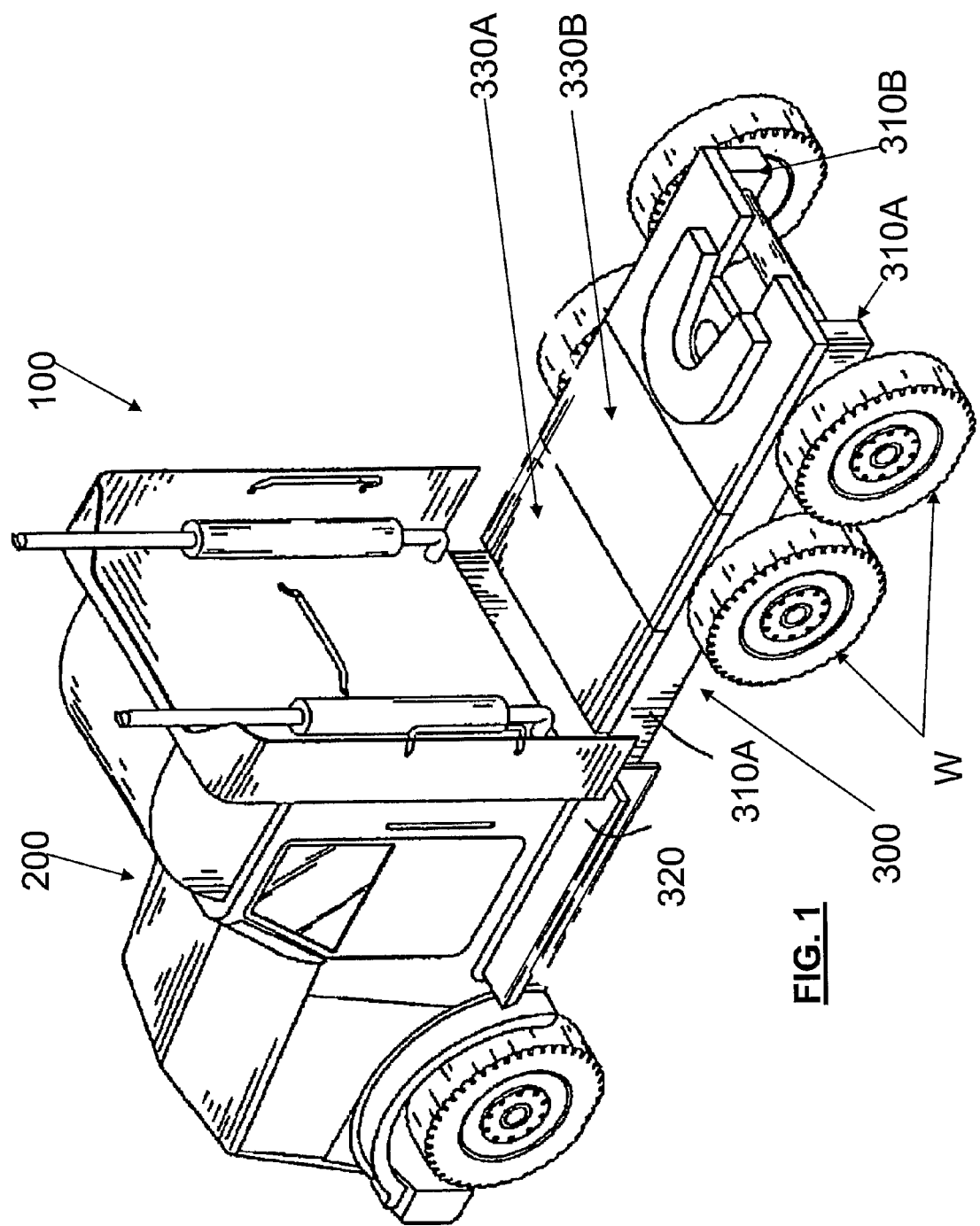
FIG. 1 is a perspective view of an illustrative truck tractor or the like upon which one or more low-profile removably clamped platform(s) of the present invention can be employed in some illustrative embodiments.
Figure 2:
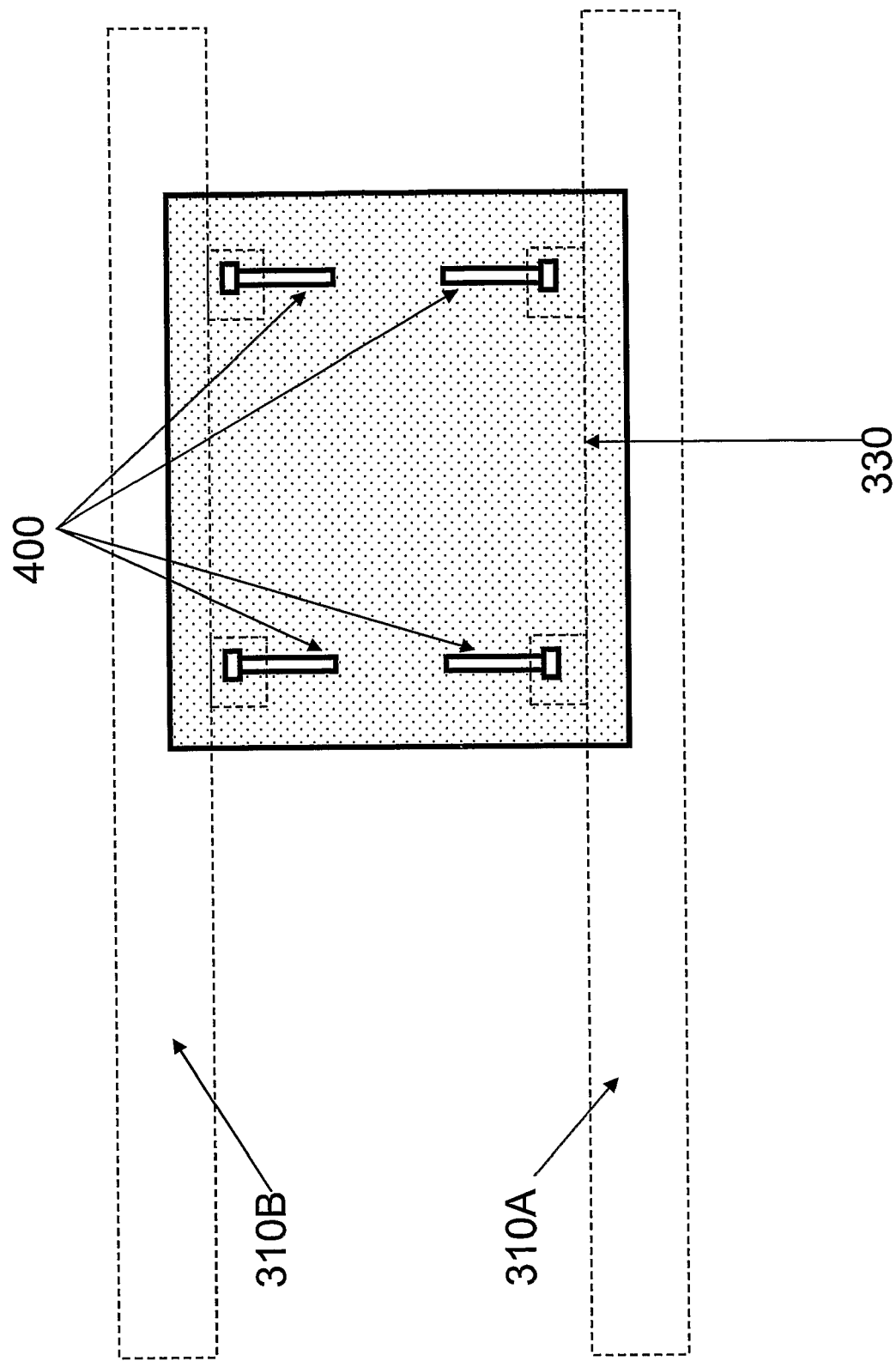
FIG. 2 is a top view showing an illustrative deck plate mounted over two frame members according to some illustrative embodiments of the invention.

As shown in FIG. 2, in some embodiments of the invention, a deck plate 330 is provided that is sized and configured so as to span between the frame members 310A and 310B.

In the preferred embodiments, at least one, preferably a plurality, of removable connector mechanisms 400 are provided that enable the deck plate 330 to be removably attached to the frame members 310A and 310B.

In brief, the connector mechanisms 400 are preferably configured so as to enable the deck plate 330 to be easily manually removed from the frame members 310A and 310B by the operator of the vehicle and/or by another individual. In some preferred embodiments, the connector mechanisms 400 do not require additional tools and are self-contained in terms of having all of the components required for manual operation. In such exemplary embodiments, the deck plate 330 can, thus, be quickly and easily manually removed without requiring additional tools or the like to be maintained, obtained and/or stored on the vehicle to enable removal of the deck plate 330.

Among other things, enabling quick and easy removal and replacement of the deck plate 330 enables certain items to be stored underneath the deck plate 330 that may require some relatively ready access by the vehicle operator and/or by other individuals. For example, providing removability and replaceability of the deck plate 330 enables one or more of the following items to be stored under the deck plate 330 in some illustrative embodiments: a) one or more batteries for the vehicle; b) one or more storage compartments for the vehicle (such as, e.g., for containing tools, tires, spare parts and/or the like); and/or c) other vehicle parts or components requiring improved accessibility by the vehicle operator and/or by other individuals.

FIGS. 3(A) to 4(B) show an illustrative and non-limiting example of a connector mechanism 400 according to some illustrative and non-limiting embodiments of the invention. In this regard, 3(A) is a perspective top view showing a connector mechanism 400 that includes a clamping arm 400CA and a clamping plate 400CP (best shown in FIG. 3(B)) in a clamped condition with the clamping arm 400CA in a clamped-and-stowed position within a receiving trough or well 330R in a deck plate 330. Among other things, positioning the clamping arm 400CA inside such a trough can enable the clamping arm to remain out of obstruction, such as, e.g., when users may need to walk about the deck plate 330 and could otherwise trip over such a clamping arm 400CA. While only one connector mechanism 400 is shown in FIGS. 3(A) to 4(B), in some preferred embodiments more than one connector mechanism can be employed in order to maintain a deck plate or platform on a vehicle or the like, such as, e.g., four connector mechanisms shown in FIG. 4, one adjacent each corner of the deck plate, as one illustrative and non-limiting example. In various embodiments, the number of such connector mechanisms 400 employed can vary based on circumstances.

Figure 3B:
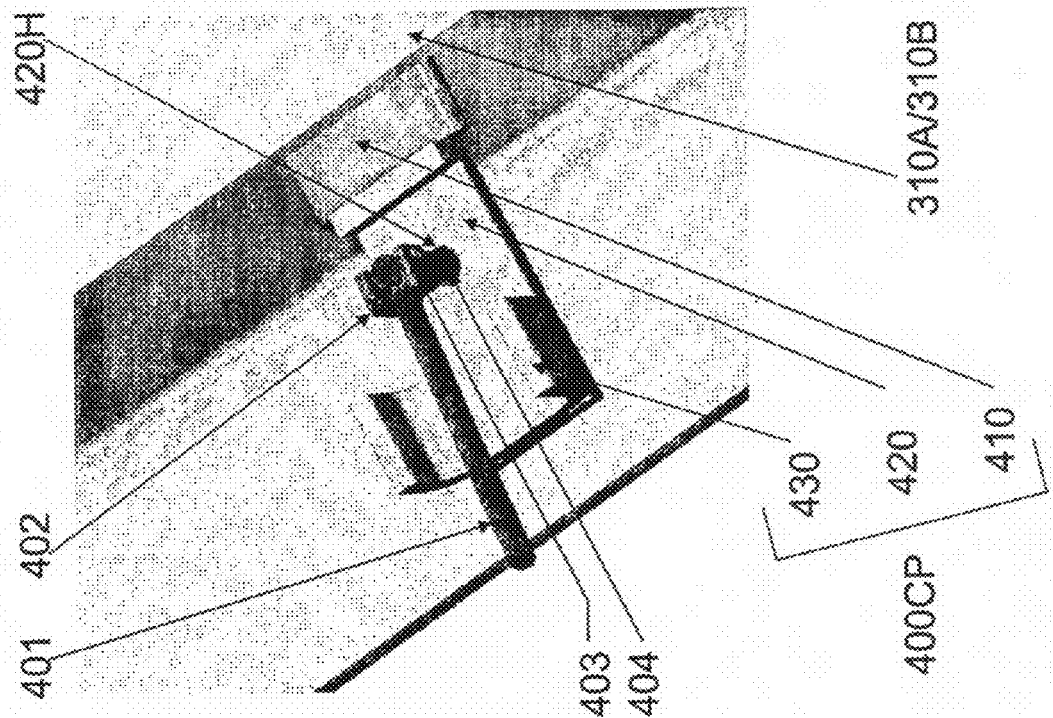
FIG. 3(B) is a perspective top view showing a clamping arm in a position similar to that shown in FIG. 3(A), but with the deck plate removed for illustration purposes.
Figure 3A:
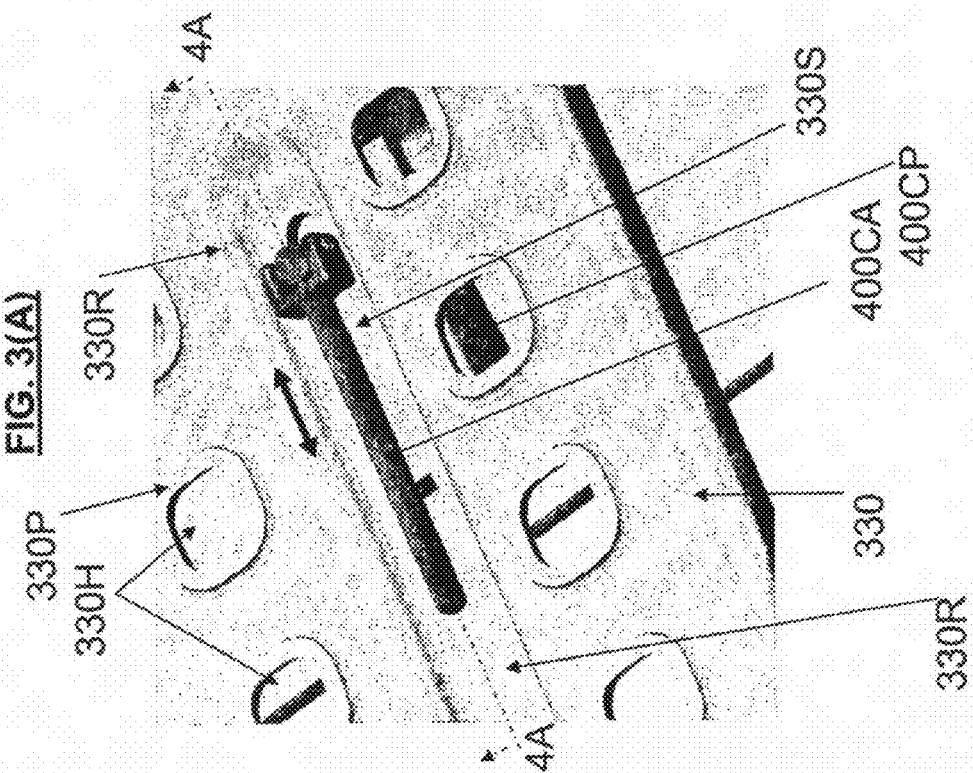
FIG. 3(A) is a perspective top view showing an assembly including a clamping arm in a clamped-and-stowed position within a receiving-trough in a deck plate.

For reference, FIG. 3(B) is an explanatory perspective top view showing a clamping arm 400CA in a position similar to that shown in FIG. 3(A), but with the deck plate 330 removed for illustration purposes. In addition, FIG. 4(A) is a cross-sectional side view of the assembly shown in FIG. 3(A) as taken along the line 4A-4A in FIG. 3(A) depicting, among other things, the manner in which the components of the connector mechanism 400 engage one another in a mounted state in some illustrative and non-limiting embodiments of the invention.

More particularly, in the embodiment of the connector mechanism 400 shown in FIG. 3(A) to FIG. 4(B), the connector mechanism 400 includes a unique and novel clamping arm 400CA and clamping plate 400CP structure. As shown in these figures, the clamping arm 400CA preferably includes two arm elements, an upper arm element 401 and a lower arm element 404. The upper arm element 401 is preferably pivotally connected to the lower arm element 404. In that regard, in the illustrated and non-limiting example, the upper arm element preferably includes a generally U-shaped member 402 fixed to a first end thereof (such as, e.g., via welding or the like) and also supports a pivot shaft 403 that extends through a through-hole in an upper end of the lower arm element 404 as best shown in FIG. 4(B).

In some preferred embodiments, the upper arm 401 has a non-cylindrical peripheral surface to facilitate operation by hand (e.g., by providing a gripping surface that is more readily manually grasped without slippage) and/or to facilitate operation via one or more tool(s) (such as, e.g., by providing a surface that is readily engaged by one or more tool(s), such as by a wrench or the like). In some illustrative embodiments, as shown, the upper arm 401 can have a substantially hexagonal cross-sectional configuration. It should be appreciated that other cross-sectional configurations can be employed in various other embodiments.

In some preferred embodiments, the lower arm element 404 has a cylindrical configuration with a circular cross-sectional shape. Preferably, the outer peripheral surface of the lower arm element 404 includes external screw threads thereâround that can be threaded into corresponding internal threads formed in a receiving hole 420H of the clamping plate 400CP and/or into corresponding internal threads formed in a locking nut 420N located beneath the clamping plate 400CP and/or fixed to the clamping plate 400CP.

With reference to FIG. 3(B), the clamping plate 400CP can include, in some illustrative and non-limiting embodiments, a first portion 410 that extends under and contacts the frame member 310A or 310B, a second portion 420 that has the receiving hole 420H, and a third portion 430 that has a U-shaped element that can abut an underside of the deck plate 330.

In the preferred embodiments, the first portion 410 can be mounted to the frame member 310A or 310B due to clamping pressures caused by engaging the connector mechanism 400 (such that, e.g., the clamping plate 400CP is drawn against an underside of the deck plate 330 due to clamping via the connector mechanism 400 in some embodiments). In some embodiments, a resilient or rubber layer can be provided in a contact area between the clamping plate 400CP and the frame member 310A or 310B. Nevertheless, in various embodiments, the clamping plate 400CP can be connected to the frame member 310A or 310B in a variety of ways. In some embodiments, for example, the first portion 410 could be fixedly connected thereto via screws, bolts, welding and/or the like (such that, e.g., the clamping plate 400CP is fixedly held thereto).

While aspects of the present invention can be used to retain a variety of platforms and can be implemented in a variety of environments, in some preferred embodiments, aspects of the present invention can be employed in the context of deck plates or the like for vehicles. With reference to, e.g., FIG. 3(A), in some illustrative and non-limiting embodiments, a deck plate 330 or the like can include a plurality of through-holes 330H having ridge portions 330P there-around in order to reduce the weight of the deck plate 330, to provide an enhanced traction surface thereon for an operator to walk, and/or to achieve other purposes.

In addition, as shown in FIG. 3(A), the deck plate 330 preferably includes a lateral trough or well 330R within which the clamping arm 400CA can be received. Moreover, the lateral trough 330R preferably includes an elongated hole or slot 330S through which the lower arm element extends to join the clamping plate 400CP. The slot 330S allows the clamping arm 400CA to slide in the direction of the double arrows shown in FIG. 3(A). This allows adjustment of the position of the deck plate with respect to the clamp when mounting the deck plate to the frame. In that regard, the slot 330S is preferably wider than the diameter of the lower arm element 404, but narrower than the width of the U-shaped member 402 of the upper arm element, such that the bottom end of the U-shaped member can provide a cam surface that cams against the top of the deck plate 330 alongside the trough 330R.

With reference to FIGS. 5(A) and 5(B), these figures show illustrative clamping forces (shown by upward and downward arrows) that can be applied in some illustrative and non-limiting embodiments of the invention. With respect to FIG. 5(A), this figure schematically demonstrates using the connector mechanism 400 so as to impart clamping forces (see arrows) upon the frame member 310A or 310B in some embodiments. While FIGS. 3(A) to 4(B) depict some illustrative and non-limiting embodiments substantially to scale, FIG. 5(A) is a more schematic representation (which omits, e.g., the trough or well 330R in the deck plate). In FIG. 5(A), the upper arm 401 of the connector mechanism 400 is depicted in a substantially upright or raised position. As described above, in order to impart the clamping forces, the arm 401 is preferably lowered to a substantially horizontal position over the deck plate. In this regard, the lower end of the U-shaped portion 402 preferably acts as a cam by the U-shaped portion having a gradually increasing distance between the bottom of the U-shaped member 402 and the pivot pin 403 as the lower arm element 404 is lowered against the deck plate or platform. While FIG. 5(A) shows clamping forces being applied so as to retain the clamping plate 400CP against the frame member 310A or 310B, it should be appreciated, however, that this is just one preferred example. In some embodiments, as discussed above, the clamping plate 400CP could alternatively be fixedly connected to the frame member 310A or 310B.

With respect to FIG. 5(B), this figure depicts the connector mechanism 400 imparting a clamping force upon the deck plate 330 between the bottom of the U-shaped portion 402 and the raised sections of the third portion 430 of the clamping plate 400CP in some embodiments. While FIG. 5(B) shows clamping forces being applied to the deck plate 330 between the clamping plate 400CP and the clamping arm 400CA, it should be appreciated, however, that this is just one illustrative example. As with FIG. 5(A), FIG. 5(B) is a more schematic representation (which omits, e.g., the trough or well 330R in the deck plate). Moreover, in FIG. 5(B), the upper arm element 401 of the connector mechanism 400 is again depicted in a raised position. As described above, in order to impart the clamping forces, the arm element 401 is preferably lowered to a substantially horizontal position over the deck plate 330.

In some embodiments, in order to secure a deck plate 330 or other platform upon a vehicle or the like, the deck plate or platform can be initially located over the clamping plate 400CP. Then, the clamping arm 400CA can be located over the platform and the lower arm element 404 can be partially inserted into the receiving hole 420H. At that point, the clamping arm 400CA and the clamping plate 400CP can preferably be moved laterally along the groove 330G (i.e., as long as the clamping arm 400CA and the clamping plate 400CP are not tightly clamped together). In this manner, with the connector mechanism(s) loosely retained on the deck plate or platform, each connector mechanism can be positioned so that the first portion 410 of the clamping plate 420 is displaced inwardly a certain amount within the perimeter of the deck plate or platform. Then, the deck plate or platform can be located upon the support, such as, e.g., between frame members 310A and 310B, with the clamping plate 420 being offset enough from the frame members 310A and 310B so as to pass there-around. Then, the connector mechanism(s) 400 can be laterally slid along the groove 330G such that the first portion 410 extends beneath the frame member 310A or 310B. Then, the clamping arm 400CA can be caused to rotate (e.g., clockwise in some examples) so as cause the clamping arm 400CA to threadingly engage with the clamping plate 400CP to achieve a tight, clamped condition. To rotate the clamping arm 400CA into a tight, claimed condition, in some embodiments, a user can manually grasp the upper arm element 401 with the upper arm raised out of the trough or well 330R and can manually rotate the upper arm element 401 around the axis of the lower arm element 404. In some examples, the angle between the axis of the upper arm element and the axis of the lower arm element can be positioned by the user at between 90 and 180 degrees (such as, e.g., at an angle of between about 30 to 60 degrees) so as to facilitate manual turning and to apply a rotational leverage without having to manually rotate the upper arm element around its own axis to impart rotation to the lower arm element. Alternatively, in some examples, the upper arm element can be caused to move using additional tools, such as using a wrench or the like. In some cases, such additional tools may be most effective while the upper arm element is substantially upright, such as depicted in FIGS. 5(A) and 5(B). In some embodiments, when the connector mechanism is moved into a clamped state as shown in FIG. 4(A), the U-shaped portion of the clamping plate will abut the underside of the deck plate or platform and the first portion 410 of the clamping plate will, thus, be caused to firmly clamp and retain the frame member 310A or 310B.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A removable deck plate assembly for a vehicle, comprising:
   a) a deck plate for placement upon a frame;
   b) a clamping plate for clamping against the frame;
   c) a clamping arm engageable with said clamping plate via a hole in said deck plate; and
   d) said clamping arm and said clamping plate being configured so as to clamp said deck plate to the frame upon moving said clamping arm into a position adjacent the deck plate.

2. The assembly of claim 1, wherein said clamping arm includes a cam.

3. The assembly of claim 2, wherein said cam is configured to cam against an upper surface of said deck plate.

4. The assembly of claim 1, wherein said clamping arm includes an upper arm element that is pivotally connected to a lower arm element, and wherein said lower arm element engages said clamping plate.

5. The assembly of claim 4, wherein said deck plate includes a trough configured to receive said upper arm element when pivoted into said position adjacent the deck plate.

6. The assembly of claim 4, wherein said lower arm element is threaded to said clamping plate.

7. The assembly of claim 4, wherein said deck plate includes an elongated hole via which said clamping arm engages with said clamping plate, and along which said clamping arm and said clamping plate are laterally slid.

8. A vehicle having a removable platform, comprising:
   a) a frame;
   b) a platform for placement upon said frame;
   c) a clamping plate for clamping against said frame;
   d) a clamping arm engageable with said clamping plate via a hole in said platform; and
   e) said clamping arm and said clamping plate being configured so as to clamp said platform to said frame upon moving said clamping arm into a position adjacent the platform.

9. The vehicle of claim 8, wherein said platform is a deck plate of a truck and wherein said clamping arm includes a cam.

10. The vehicle of claim 9, wherein said cam is configured to cam against an upper surface of said deck plate.

11. The vehicle of claim 8, wherein said clamping arm includes an upper arm element that is pivotally connected to a lower arm element, and wherein said lower arm element engages said clamping plate.

12. The vehicle of claim 11, wherein said platform includes a trough configured to receive said upper arm element when pivoted into the position adjacent the platform.

13. The vehicle of claim 11, wherein said lower arm element is threaded to said clamping plate.

14. The vehicle of claim 13, wherein said platform includes an elongated hole via which said clamping arm engages with said clamping plate, and along which said clamping arm and clamping plate are laterally slid.

15. A method for removably mounting a platform upon a vehicle, comprising:
  a) providing a platform and a clamping plate beneath the platform;
  b) locating the platform upon a frame of a vehicle with the clamping plate located adjacent to the frame;
  c) moving said clamping plate laterally beneath said frame, and then
  d) moving said clamping plate linearly upwardly to clamp said frame between said clamping plate and said platform.

16. The method of claim 15, further including performing said steps c) and d) manually without ancillary tools.

17. The method of claim 15, further including providing a clamping arm engaged with said clamping plate via an elongated hole in said platform, and wherein said step c) includes manually sliding said clamping arm along said elongated hole.

18. The method of claim 15, further including performing said step d) using a clamping arm that is pivoted downward against the platform so as to clamp said platform to the frame upon moving said clamping arm adjacent the platform.

19. A method for removably mounting a deck plate upon a vehicle, comprising:
  a) providing a deck plate between chassis frame members and providing at least one connector mechanism that extends from over the deck plate downward through the deck plate for connecting the platform to at least one of the chassis frame members;
  b) manually connecting the platform to at least one of the chassis frame members using the at least one connector mechanism without any ancillary tools wherein said manually connecting the platform to at least one of the chassis frame members using the at least one connector mechanism without any ancillary tools includes manually laterally moving a clamping plate adjacent at least one of the frame members without ancillary tools and then manually vertically moving the clamping plate into contact with the at least one of the frame members without ancillary tools.

20. The method of claim 19, further including providing said connector mechanism within the periphery of said deck plate such that a second deck plate can be mounted in an abutting relationship alongside said deck plate without interference from said connector mechanism.

* * * * *